US012286332B2

(12) United States Patent
Boos

(10) Patent No.: US 12,286,332 B2
(45) Date of Patent: Apr. 29, 2025

(54) FAST ASSEMBLY HEAD FOR A TELESCOPIC BOOM AND METHOD OF ASSEMBLING SAME

(71) Applicant: Liebherr-Werk Ehingen GmbH, Ehingen/Donau (DE)

(72) Inventor: Bernd Boos, Mehrstetten (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 0 days.

(21) Appl. No.: 18/438,259

(22) Filed: Feb. 9, 2024

(65) Prior Publication Data

US 2024/0246795 A1 Jul. 25, 2024

Related U.S. Application Data

(63) Continuation of application No. 17/402,308, filed on Aug. 13, 2021, now Pat. No. 11,975,950.

(30) Foreign Application Priority Data

Aug. 13, 2020 (DE) ..................... 10 2020 121 348.4

(51) Int. Cl.
*B66C 23/70* (2006.01)
*B66C 23/66* (2006.01)

(52) U.S. Cl.
CPC ............ *B66C 23/707* (2013.01); *B66C 23/66* (2013.01)

(58) Field of Classification Search
CPC ...... B66C 23/66; B66C 23/707; B66C 23/701
See application file for complete search history.

(56) References Cited

U.S. PATENT DOCUMENTS 3,243,052 A 3/1966 Grove
8,127,951 B2 * 3/2012 Conrad .................. B66C 23/66 212/348
8,739,987 B2 6/2014 Martin et al.
9,738,497 B2 8/2017 Nakamura et al.
11,975,950 B2 * 5/2024 Boos ..................... B66C 23/707
2010/0038333 A1 * 2/2010 Conrad .................. B66C 23/66 212/177
2010/0213152 A1 8/2010 Martin et al.
2014/0353272 A1 12/2014 Nakamura et al.

FOREIGN PATENT DOCUMENTS

DE 202008008173 U1 11/2009
DE 102015001619 A1 8/2016

* cited by examiner

*Primary Examiner* — Emmanuel M Marcelo
*Assistant Examiner* — Juan J Campos, Jr.
(74) *Attorney, Agent, or Firm* — McCoy Russell LLP

(57) ABSTRACT

The disclosure relates to an assembly head for a telescopic boom that can be separated into an inner and an outer boom set and that is reversibly mountable at an inner telescopic section of the outer boom set. The assembly head comprises a pulley head having deflection pulleys and a telescopic tube section that is arranged the pulley head, that can be pushed into the inner telescopic section from its end, and that has a substantially smaller length than the inner telescopic section. The disclosure further relates to a separable telescopic boom having an assembly head in accordance with the disclosure, to a mobile crane having a telescopic boom in accordance with the disclosure, and to a method for the self-assembly of an assembly head in accordance with the disclosure at the outer boom set of a telescopic boom.

13 Claims, 4 Drawing Sheets

FAST ASSEMBLY HEAD FOR A TELESCOPIC BOOM AND METHOD OF ASSEMBLING SAME

CROSS REFERENCE TO RELATED APPLICATIONS

The present application is a continuation of U.S. Non-Provisional patent application Ser. No. 17/402,308, entitled "FAST ASSEMBLY HEAD FOR A TELESCOPIC BOOM AND METHOD OF ASSEMBLING SAME", and filed on Aug. 13, 2021. U.S. Non-Provisional patent application Ser. No. 17/402,308 claims priority to German Patent Application No. 10 2020 121 348.4 filed on Aug. 13, 2020. The entire contents of each of the above-listed applications are hereby incorporated by reference for all purposes.

TECHNICAL FIELD

The present disclosure relates to an assembly head for a telescopic boom that can be separated into two boom sets, to such a separable telescopic boom, to a mobile crane having such a telescopic boom, and to a method of assembling such an assembly head on the telescopic boom.

BACKGROUND AND SUMMARY

With large travelable cranes or mobile cranes, telescopic booms are typically used having a plurality of telescopic sections displaceably supported in one another. To reduce the weight for road transport and to thereby obtain a total permitted weight in accordance with legal road traffic regulations, it is customary to dismantle a plurality of telescopic sections and to reattach them at the deployment site. The removable telescopic sections here represent the inner telescopic sections of the boom (also called an inner telescopic boom set or boom set) and thus also comprise the innermost telescopic section that supports the pulley head for deflecting and reeving the hoist rope.

The disassembled mobile crane and the dismantled inner boom set are traveled to the deployment site separately. Until the latter has arrived at the deployment site and the removed telescopic sections have been reattached to the boom (to the outer boom set), the mobile crane is, however, not usable independently since without the pulley head no means is present to connect to and lift loads. No independent or separate assembly (=establishing of a working state from a transport state of the crane, e.g. attachment of further components such as ballast mounts, ballast plates, support devices, base plates, etc. that are dismantled for road transport) of the mobile crane is this not possible either.

It is therefore the underlying object of the present disclosure to provide a possibility with a mobile crane of the category having a separable telescopic boom of also being able to use the crane for work deployments that has been disassembled by removing an inner boom set from the telescopic boom.

This object is achieved in accordance with the embodiments of the present disclosure. Advantageous embodiments of the disclosure result from the following description.

On the one hand, an assembly head for a telescopic boom is proposed that can be separated into an inner and an outer boom set and that is reversibly mountable at an inner telescopic section of the outer boom set. The assembly head in accordance with the disclosure comprises a pulley head having deflection pulleys and a telescopic tube section that is arranged at the pulley head, that can be pushed into the inner telescopic section from its end (that is from the front), and that has a substantially smaller length than the inner telescopic section.

A fast assembly head is therefore provided in accordance with the disclosure that is formed as an attachment head, that comprises a complete pulley head, and that can be placed fast and simply onto the inner telescopic section of the disassembled telescopic boom or of the outer boom set. The mobile crane disassembled for the purpose of a weight reduction for road transport and having a dismantled inner boom set can thereby already be used for work deployments or lifting work before the attachment of the removed telescopic sections. These deployments can, for example, be preparatory work for the independent assembly of the mobile crane or even a complete self-assembly.

The innermost telescopic section of the outer boom set may be called the inner telescopic section. In principle, however, a fastening of the assembly head to a plurality of telescopic sections is also conceivable, for example a pushing of the telescopic tube section into the innermost telescopic section and a connection or pinning to the innermost telescopic section and/or to a further telescopic section surrounding it. However, only a reduced telescopic length is thereby available for the partial boom with an installed assembly head.

The telescopic tube section of the assembly head in accordance with the disclosure has a considerably smaller length than that of the telescopic sections of the telescopic boom. The length of the telescopic tube section can be smaller than half, for instance smaller than a quarter of the length of the inner telescopic section. The telescopic tube section can also have a similar or substantially the same length as the pulley head (with a fastened assembly head viewed in the direction of the longitudinal axis of the boom). It is likewise possible to define the length of the telescopic tube section via the dimensions of the collar of the inner telescopic section. The length of the telescopic tube section can thus be dimensioned such that, in the assembled state of the assembly head and with a completely retracted outer boom set, it only extends in the region of the mutually adjacent collars of the telescopic sections of the outer boom set or at least does not substantially extend beyond it.

The fastened assembly head accordingly only contacts the inner telescopic section or the outer boom set at its tip in a relatively small region. The assembly head thereby has a small weight and can, for example, already be mounted prior to transport to be directly ready for use after the arrival of the mobile crane on the construction site. The assembly head is removed again prior to the attachment of the independently transported inner boom set.

The telescopic tube section can be configured such that its outer contour substantially follows/corresponds to the inner contour of the inner telescopic section. The telescopic tube section thereby contacts the inner sides of the inner telescopic section and/or lies on one or more support points.

The telescopic tube section of the assembly head cannot be a telescopic section of the telescopic boom. The telescopic tube section only serves the guidance and support or fastening of the assembly head at the inner telescopic boom and cannot be moved or telescoped relative to the outer boom set or to the inner telescopic section after assembly.

Provision is made in a further embodiment that the pulley head has connection means that are connectable, for instance pinnable, to connection means of the inner telescopic section. The connection means of the inner telescopic section can be arranged at its collar. The connection means may be pinning points for establishing a releasable pin connection.

The connection means of the assembly head and the telescopic section can be brought into overlap by pushing in the assembly head or by extending the inner telescopic section. The force transmission between the assembly head and the surrounding telescopic section therefore does not take place or does not take place to a substantial extent via the telescopic tube section, but via the established connection of the connection means or via the establishing pinning connection.

The connection means of the assembly head and the inner telescopic section can be configured in accordance with the connection means between the innermost telescopic section with a pulley head and the telescopic section surrounding it corresponding to the connection means described in DE 10 2015 001 619 A1.

Provision is made in a further embodiment that the pulley head has a fastening point or rope connection point at which an assembly rope can be fastened to lift the assembly head, with the fastening point being disposed above the center of gravity of the assembly head in the raised state. The assembly head thereby independently aligns itself into its assembly position during lifting.

A guide element is provided in a further embodiment that cooperates with a corresponding guide element of the inner telescopic section during the assembly of the assembly head to facilitate an introduction of the telescopic tube section into the inner telescopic section, with the guide element of the assembly head being arranged at the telescopic tube section. The introduction or threading of the telescopic tube section into the inner telescopic section is thereby facilitated so that, after the raising of the assembly head to the corresponding height in the region before the end of the inner telescopic section, it ideally only has to be extended until the pulley head abuts the collar of the telescopic section. The guide elements can be designed and can have one or more inner chamfers that impart a correct fine adjustment of the assembly head on the introduction of the telescopic tube section or on the joining together of the guide elements. A simple and rapid self-assembly of the assembly head is thereby made possible.

The assembly head in accordance with the disclosure cannot be configured as a fully-fledged heavy duty assembly head and therefore has a smaller weight than such a one. It can thereby be possible to transport the assembly head together with the outer boom set without exceeding the permitted maximum weight. An embodiment is, however, also conceivable in principle in which the assembly head in accordance with the disclosure is configured as a fully-fledged heavy duty assembly head and is optionally transported to the deployment site separately.

The present disclosure further relates to a telescopic boom for a crane, such as for a mobile crane, that can be separated or dismantled into two boom sets. The telescopic boom in accordance with the disclosure here comprises an outer boom set having a coupling section and at least one telescopic section displaceably and/or telescopically supported in the coupling section, an inner boom set having at least one additional telescopic section that can be displaceably supported in an inner telescopic section of the outer boom set, and an assembly head in accordance with the disclosure that can be reversibly mounted at the inner telescopic section. The properties and advantages described with respect to the assembly head in accordance with the disclosure apply accordingly to the telescopic boom having the assembly head.

The inner boom set (or the outermost telescopic section of the inner boom set) can be received by the inner telescopic section of the outer boom set. Both the outer and the inner boom set can each comprise two or more telescopic sections displaceably or telescopically supported in one another.

An assembly arm is provided in a further embodiment that is mounted or mountable at the outer boom set, for instance outwardly at the coupling section, and that is movable from a transport position into an assembly position and vice versa. The assembly arm can alternatively be attached or attachable to one of the further telescopic sections of the outer boom set that is not the innermost telescopic section. In the assembly position, the assembly arm serves the self-assembly of the assembly head in accordance with the disclosure at the inner telescopic section of the outer boom set. For transport and optionally during work operation, the assembly arm is, in contrast, in the transport position in which it can contact the telescopic boom or the outer boom set. The inner telescopic section can be movable or displaceable relative to the assembly arm. The assembly arm can be latchable in the transport and/or assembly position.

The assembly arm can be mounted or mountable to a fastening device for a guying of the telescopic boom. It can here, for example, be a fastening device for a Y guying of the telescopic boom that is fixedly connected to the coupling section. The connection points that are anyway provided at the boom and that are provided for the mounting of the guying can thus be used for the fastening of the assembly arm. They have sufficiently large dimensions and are not occupied during the use of the assembly arm for lifting and assembly of the assembly head.

If no (Y) guying is used for the crane deployment, the assembly arm can even remain at the telescopic boom. The assembly arm would only have to be dismantled when the (Y) guying is attached. It is, however, also conceivable to reconfigure the mounts for the (Y) guying such that they can simultaneously take up the (Y) guying and the assembly arm so that the assembly arm can also remain mounted with a guyed telescopic boom. On the use of a (Y) guying, the same auxiliary crane that is used for its assembly/disassembly can be used for the attachment/removal of the assembly arm.

Provision is made in a further embodiment that the assembly arm has a deflection pulley via which an assembly rope is guidable for the lifting of the assembly head, with the assembly rope being fastenable to a fastening point of the assembly head.

Provision is made in a further embodiment that the axis of rotation of the deflection pulley is inclined (at least in the transport position) toward the longitudinal axis of the outer boom set or of the inner telescopic section, i.e. is not oriented perpendicularly or in parallel, and/or that the axis of rotation of the deflection pulley Is inclined toward the longitudinal axis of the assembly arm, i.e. is not oriented perpendicularly or in parallel. The deflection pulley can be arranged offset or angulated with respect to the longitudinal axis of the assembly arm. An embodiment of the assembly arm is thereby possible by which the deflection pulley does not project beyond the outlines of the outer boom set in the transport position. Provision can further be made that the axis of rotation of the deflection pulley is oriented perpendicular or approximately perpendicular to the longitudinal axis of the outer boom set in the assembly position.

Provision is made in a further embodiment that the assembly arm is supported pivotably about an axis at the outer boom set, said axis may be included toward the longitudinal axis of the outer boom set, i.e. is not oriented in perpendicularly or in parallel. The axis can be aligned horizontally on a horizontal alignment of the outer boom set.

Alternatively, instead of a pivot mechanism about an individual axis, a different mechanism can be used to be able to move the assembly arm between the transport position and the assembly position. An articulated joint would be conceivable here, for example. It is furthermore conceivable that the movement of the assembly arm between the transport and assembly positions takes place by means of an actuator (e.g. a hydraulic cylinder).

Provision is made in a further embodiment that the assembly arm does not project beyond the outer contour or outlines of the vehicle in the transport position. The assembly arm can thereby be transported together with the disassembled mobile crane without taking up additional space. It is furthermore conceivable also to leave the assembly arm at the telescopic boom during the work deployment of the mobile crane in certain or all deployment situations. The assembly and disassembly procedure of the assembly head is thereby further accelerated and simplified.

The present disclosure furthermore relates to a mobile crane having a telescopic boom in accordance with the disclosure. In this respect, the same advantages and properties obviously result as for the telescopic boom and assembly head in accordance with the disclosure so that a repeat description will be dispensed with at this point.

The present disclosure further relates to a method of assembling an assembly head in accordance with the disclosure to the outer boom set of a telescopic boom in accordance with the disclosure, the method comprising the steps:

- moving the assembly arm from the transport position into the assembly position;
- guiding or reeving the assembly rope over the deflection pulley of the assembly arm and connecting the assembly rope to the assembly head;
- raising the assembly head to the height of the inner telescopic section by retracting the assembly rope;
- connecting, such as pinning, the assembly head to the inner telescopic section;
- releasing the assembly rope from the assembly head and removing the assembly rope from the assembly arm; and
- moving the assembly arm from the assembly position into the transport position.

The reeving of a hoist rope via the deflection pulleys of the pulley head and of a load suspension means, such as a hook block, can take place as a further step.

An independent attachment of the assembly head in accordance with the disclosure to the outer boom set is possible by means of the method in accordance with the disclosure without having to rely on external aids such as an auxiliary crane. If the total weight of the mobile crane with the outer boom set and the assembled assembly head remains below the permitted weight limit for road transport, the self-assembly of the assembly head can already take place in accordance with the method in accordance with the disclosure before the transport.

If the self-assembly method in accordance with the disclosure for the assembly head described above is expanded to include subsequent steps of raising and assembling further crane components with the aid of the now assembled assembly head, a method for the self-assembly of the total telescopic boom and optionally of the mobile crane results. For this purpose, the assembly head has to be formed in a correspondingly stable manner (for example as a heavy duty assembly head) to be able to lift the great loads of the further crane components to be attached.

Provision is made in an embodiment that the assembly head is mounted at the outer boom set by establishing a pinning connection between the pulley head and the inner telescopic section. Alternatively or additionally, however, a pinning to a further telescopic section of the outer boom set can also be provided.

Provision is made in a further embodiment that the inner telescopic section is partially extended before the step of connecting the assembly head to the inner telescopic section to mount or thread in the telescopic tube section of the assembly head. The assembly rope can be fastened to a rope connection point that is located above the total center of gravity of the assembly head in the suspended state thereof. The assembly head is thereby automatically aligned after raising such that the telescopic tube section faces laterally in the direction of the opening of the inner telescopic section as soon as the assembly head has been raised to the height of the inner telescopic section. The latter thus only still has to be extended until the pulley head abuts its collar. The pinning connection between the assembly head and the telescopic section can then be established.

BRIEF DESCRIPTION OF THE FIGURES

Further features, details, and advantages of the disclosure result from the embodiment explained in the following with reference to the Figures. There are shown.

DETAILED DESCRIPTION

Figure 1:
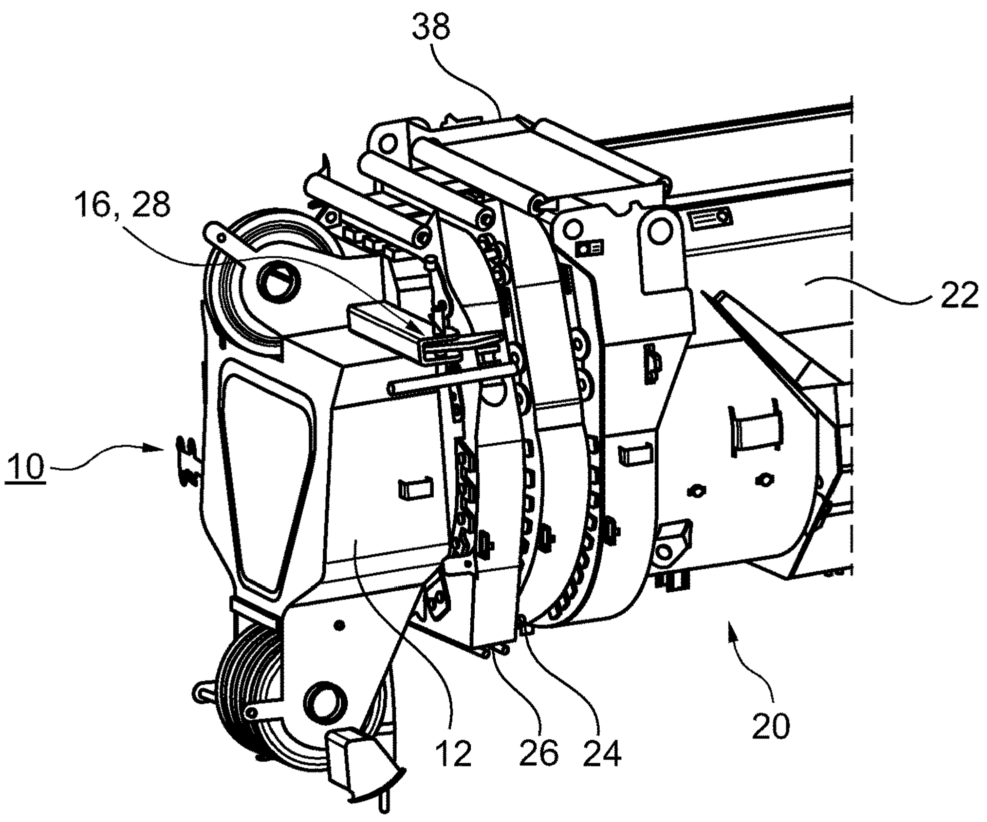
FIG. 1: the assembly head in accordance with a certain embodiment assembled at the outer boom set of a telescopic boom in a perspective view
Figure 2:
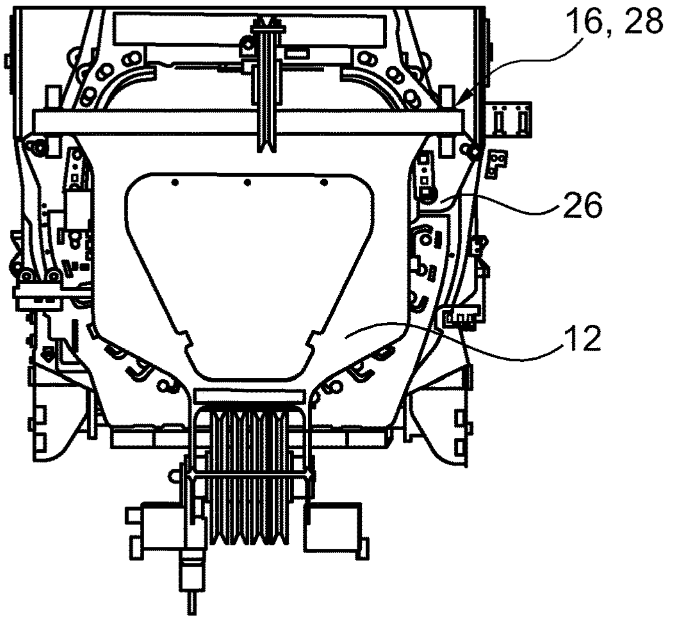
FIG. 2: the assembly head of FIG. 1 in a frontal view.

A certain embodiment of the assembly head 10 in accordance with the disclosure is shown in a perspective view in FIG. 1, with the assembly head 10 being assembled at the outer boom set 20 of a telescopic boom of a mobile crane disassembled for transport, i.e. separated into an outer and an inner boom set. FIG. 2 shows a frontal view of the assembly head 10 fastened to the outer boom set. The outer boom set 20 comprises a coupling section 22 connected in an articulated manner to the mobile crane, not shown in any more detail, and two telescopic sections 24, 26 that are displaceably or telescopically supported are completely retracted. The innermost of the two telescopic sections 24, 26 is called the "inner telescopic section" 26 in the following.

Figure 3:
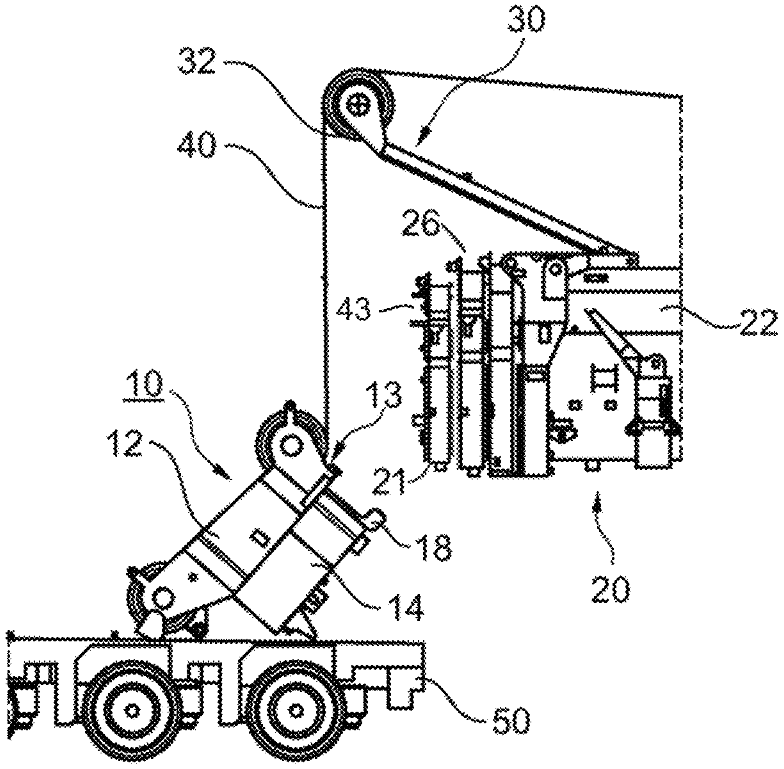
FIGS. 3-7: different steps of the assembly method in accordance with the disclosure in a lateral view of the outer boom set.
Figure 4:
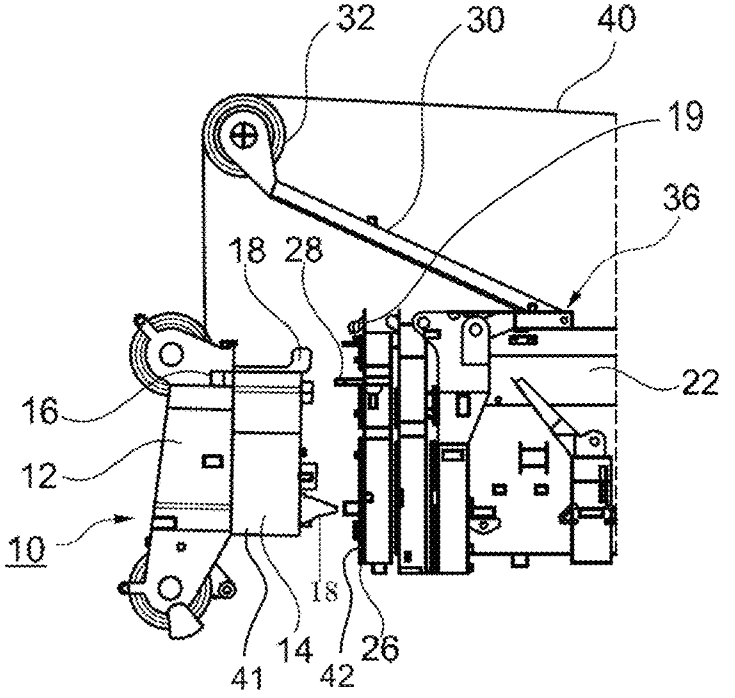

The assembly head 10, that can also be called a fast assembly head comprises a complete pulley head 12 having an upper deflection pulley and a lower pulley set for guiding or reeving a hoist rope (not shown) and a short telescopic tube section 14 that cannot be seen in FIGS. 1-2 since it is located fully within the inner telescopic section 26 (the telescopic tube section 14 can be recognized in FIGS. 3 and 4).

The assembly head 10 is an attachment head that is assembled by pushing the telescopic tube section 14 into the inner telescopic section 26 and subsequent establishing of a pinning connection between the pulley head 12 and the inner telescopic section 26 at the outer boom set 20. For this purpose, the pulley head 12 and the collar 27 extending around the opening of the inner telescopic section 26 at the front face each have connection means 16, 28 formed as pinning points. This means that the force transmission between the assembly head 10 and the inner telescopic section 26 surrounding it does not take place or only takes place to an insignificant extent via the telescopic tube section 14, but rather via the established pinning connection 16, 28.

The telescopic tube section 14 is substantially shorter than the telescopic sections 24, 26 of the outer boom set 20 and does not represent a telescopic section. The telescopic tube section 14 rather serves the stable fastening/support of the assembly head 10 at/in the inner telescopic section 26. In the present embodiment, the telescopic tube section 14 therefore has a length that substantially corresponds to the length of the pulley head 12 and thus only extends in the outermost end region of the inner telescopic section 26 in the assembled state. The assembly head 10 thereby only has a relatively low weight and can as a rule be transported together with the disassembled telescopic boom, i.e. in a state mounted at the outer boom set 20. The outer contour 41 of the telescopic tube section 14 can substantially correspond to the inner contour 42 of the inner telescopic section 26. The telescopic tube section 14 can contact a support point 43 of the inner telescopic section 26 on which an outer telescopic section of the inner boom set is supported in the assembled state.

The additional telescopic sections that are not shown in any more detail here, that are called the "inner boom set", and that are telescopically supported in the inner telescopic section 26 of the outer boom set 20 and comprise the innermost telescopic section with the boom head are in contrast dismantled for the purpose of a weight reduction for road transport and are transported to the deployment site separately. It is now possible by means of the assembly head 10 in accordance with the disclosure to use the disassembled mobile crane with a dismantled telescopic boom independently for lifting work, for example for preparatory work for a self-assembly of the mobile crane, even though the actual boom head of the inner boom set is not attached. The assembly head 10 is removed prior to attachment of the removed additional telescopic sections.

FIGS. 3 to 7 show different sections of the method in accordance with the disclosure for the self-assembly of the assembly head 10 in accordance with the disclosure at the outer boom set 20 in each case in a side view of the boom. The self-assembly method can be carried out before or after the transport to the deployment site.

An assembly arm 30 that has a deflection pulley 32 rotatable about a horizontal axis at its end about which axis an assembly rope 40 is guidable is fastened to the coupling section 22 of the outer boom set 20. The assembly arm 30 is mounted via a console 36 at a fastening device 38 of the coupling section 20 to which a Y guying of the telescopic boom can be attached. No additional mount for the assembly arm 30 thereby has to be provided at the coupling section 22. The Y guying is also not in use during the assembly and use of the assembly head 10 so that the fastening device 38 is readily usable. If no guying is necessary, the assembly arm 30 could even remain at the coupling section 22. A disassembly of the assembly arm 30 is, however, also likewise possible after the use of the assembly head 10.

Figure 8:
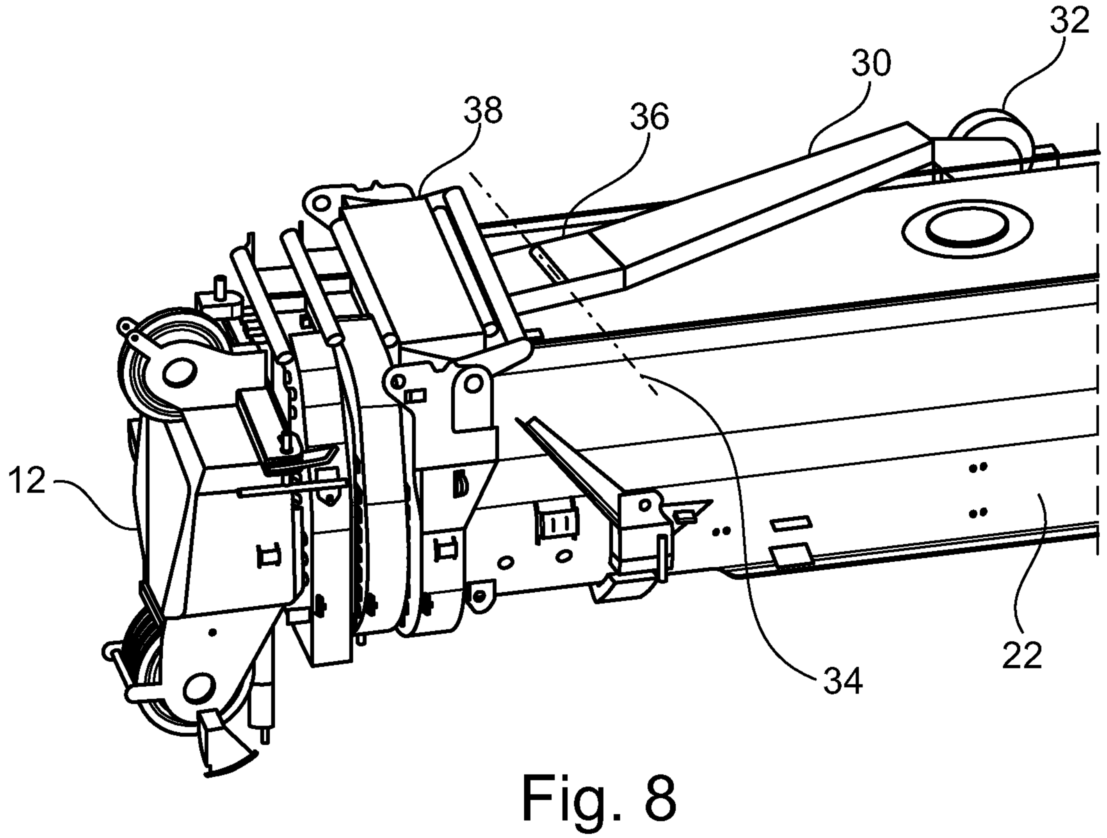
FIG. 8: the outer boom set with an assembly arm in the transport position of FIG. 7 in a perspective view.

As can be recognized in FIG. 8, the assembly arm 30 is pivotable about a pivot axis 34 inclined toward the longitudinal axis of the coupling section 22 between a transport position in which it contacts the coupling section 22 (cf. FIGS. 7-8) and an assembly position in which it is usable to raise the assembly head 10 (cf. FIGS. 3-6). The deflection pulley 32 is arranged laterally offset with respect to the console 36 and the axis of rotation of the deflection pulley 32 is inclined toward the longitudinal axis of the assembly arm 30. The deflection pulley 32 is to the side of the coupling section 22 in the transport position due to this offset so that the total assembly arm 30 does not project or does not substantially project beyond the outlines of the outer boom set 20 (cf. FIG. 7) and the permitted dimensions in public road traffic for mobile work machines are observed. In the assembly position, the axis of rotation of the deflection pulley 32 is in contrast substantially perpendicular or approximately perpendicular to the longitudinal axis of the coupling section 22 and the assembly arm 30 with the deflection pulley 32 projects to the front beyond the tip of the retracted outer boom set 20.

The assembly head 10 has a rope connection point 13 that is arranged such that it is above the center of gravity of the assembly head 10 in its raised and/or suspended state thereof. The suspended assembly head 10 is thereby automatically correctly aligned in the air so that the telescopic tube section 14 faces in the direction of the inner telescopic section 26 (cf. FIG. 4).

In the first step of the self-assembly method (FIG. 3), the assembly arm 30 is pivoted into (and optionally latched in) the assembly position, the assembly rope 40 is guided around the deflection pulley 32 and is fastened to the rope connection point 13 of the assembly head 10. The assembly head 10 is located on a transport vehicle 50 (that was e.g. driven to the deployment site to attach the assembly head on site—it can alternatively already be attached before the road transport and traveled together with the mobile crane) and can now be raised by retracting the assembly rope 40. No auxiliary crane or other external tool is required for this, the lifting mechanism is located at the boom set 20 itself.

FIG. 4 shows the suspended assembly head 10 after it has been raised to the height of the inner telescopic section 26. Due to the self-alignment, the telescopic tube section 14 faces the opening of the inner telescopic section 26. To facilitate the introduction of the telescopic tube section 14 into the inner telescopic section 26, a guide element 18 is arranged at the telescopic tube section 14 and cooperates with a guide element 19 of the inner telescopic section 26 (e.g. a rail or the like).

Figure 5:
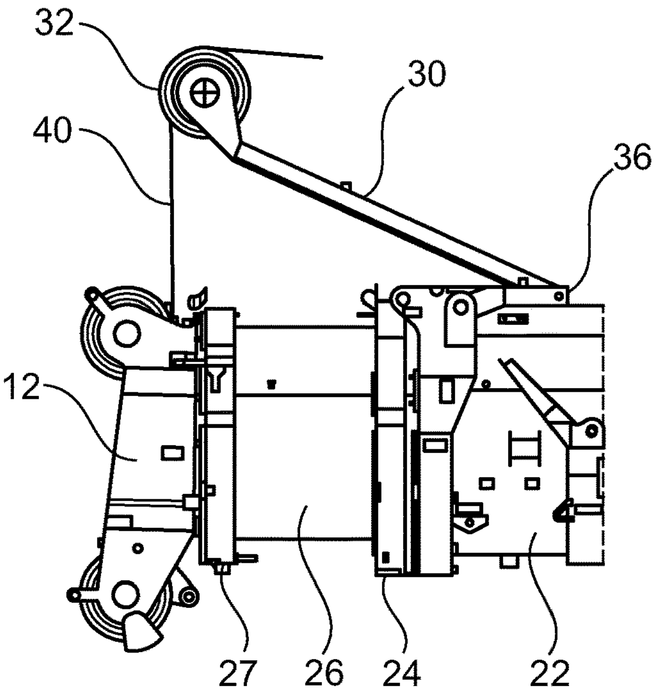

In the next step, the inner telescopic section 26 is extended for so long until the pulley head 12 of the assembly head 10 abuts the collar 27 of the inner telescopic section 26 (FIG. 5). The pinning connection of the combined connection means 16, 28 can now be established.

The support point 43 in the collar of the telescopic section 26 receives the telescopic tube section 14 in the existing support for the inner telescopic section. This mount is, however, ring-shaped and linear and can only take up forces in a plane perpendicularly intersecting the telescopic section.

All the forces in the other directions can be taken up via the pinning connection 16, 28 in accordance with FIG. 4 that has to have sufficiently large dimensions. An abutment can additionally be provided that introduces the forces in the longitudinal direction of the telescopic boom directly from the assembly head 10 into the collar of the telescopic section 26.

Figure 6:
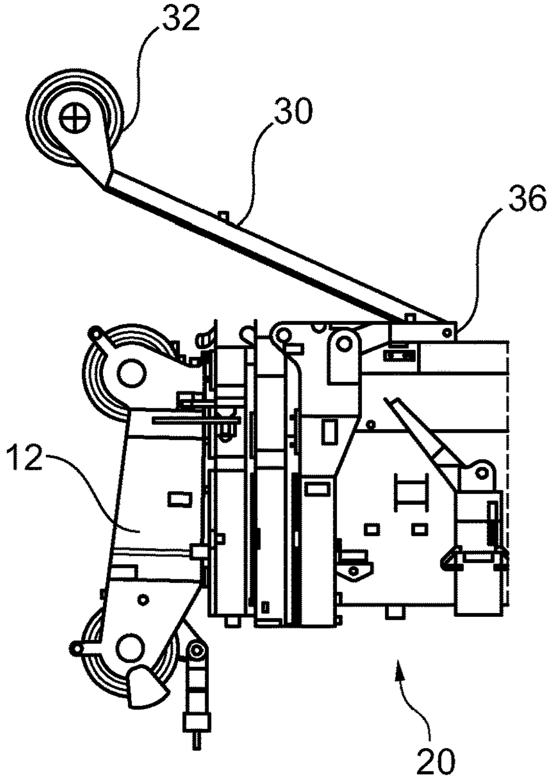
Figure 7:
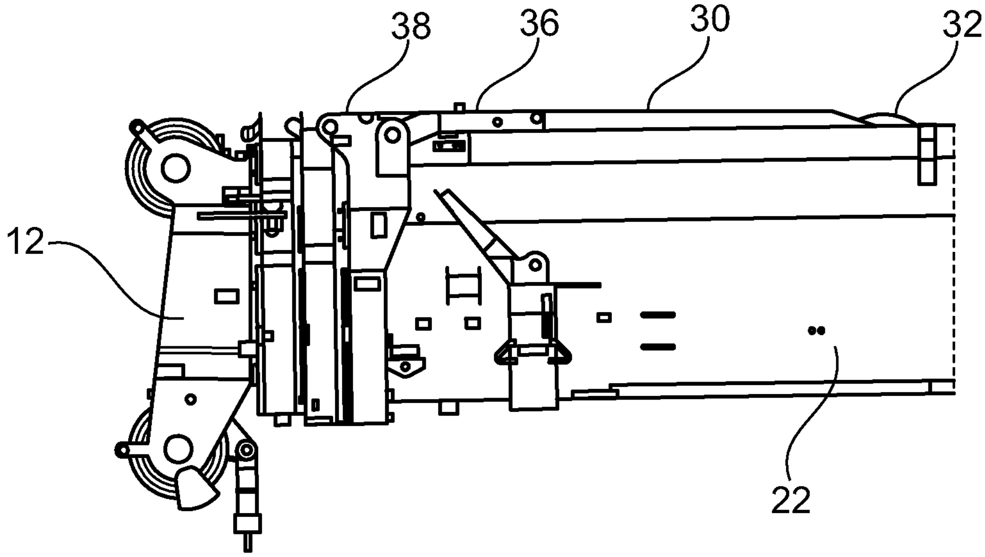

FIG. 6 shows the assembled assembly head 10 after the assembly rope 40 has been released and has been removed or unreeved from the assembly arm 30 and after the inner telescopic section 26 has been fully retracted again. The assembly head 10 is ready for use after the folding in (and optional latching) of the assembly arm 30 into the transport position (FIG. 7) and after the reeving of a hoist rope over the deflection pulleys at the pulley head 12 and the rollers of a hook block. The dismantling of the assembly head 10 takes place in the reverse order of the previously described steps.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE NUMERAL LIST

10 assembly head
12 pulley head
13 fastening point
14 telescopic tube section
16 connection means
18 guide element
20 outer boom set
22 coupling section
24 telescopic section
26 inner telescopic section
27 collar
28 connection means
30 assembly arm
32 deflection pulley
34 pivot axis
36 console
38 fastening device
40 assembly rope
50 transport vehicle

The invention claimed is:

1. A telescopic boom with an assembly head, wherein the telescopic boom can be separated, the assembly head detachably mounted at an inner telescopic section of an outer boom set, the assembly head comprising a pulley head having deflection pulleys and comprising a telescopic tube section that is arranged at the pulley head, wherein the telescopic tube section can be pushed into the inner telescopic section, wherein the telescopic tube section has a smaller length than the inner telescopic section, and wherein the telescopic tube section does not extend beyond a collar of an outer boom set of the telescopic boom.

2. The telescopic boom with an assembly head in accordance with claim 1, wherein the telescopic tube section and the telescopic boom are different.

3. The telescopic boom with an assembly head in accordance with claim 1, wherein the pulley head has connection means that are connectable to connection means of the inner telescopic section.

4. The telescopic boom with an assembly head in accordance with claim 3, wherein the connection means of the inner telescopic section is arranged at a collar of the inner telescopic section.

5. The telescopic boom with an assembly head in accordance with claim 1, wherein the pulley head has a fastening point to which an assembly rope can be fastened to lift the assembly head, with the fastening point being disposed above a center of gravity of the assembly head in a raised state.

6. The telescopic boom with an assembly head in accordance with claim 1, wherein a guide element is provided that is arranged at the telescopic tube section and that cooperates with a guide element of the inner telescopic section on the assembly of the assembly head to facilitate an introduction of the telescopic tube section.

7. The telescopic boom with an assembly head in accordance with claim 1, wherein the length of the telescopic tube section is smaller than half than a length of the inner telescopic section.

8. The telescopic boom with an assembly head in accordance with claim 1, wherein the length of the telescopic tube section is the same as a length of the pulley head.

9. The telescopic boom with an assembly head in accordance with claim 1, wherein an outer contour of the telescopic tube section follows an inner contour of the inner telescopic section.

10. The telescopic boom with an assembly head in accordance with claim 9, wherein the telescopic tube section contacts inner sides of the inner telescopic section and/or lies on one or more support points.

11. The telescopic boom with an assembly head in accordance with claim 1, wherein the telescopic tube section is not a telescopic section of the telescopic boom.

12. The telescopic boom with an assembly head in accordance with claim 1, wherein pushing the telescopic tube section into the inner telescopic section establishes a pinning connection between the pulley head and the inner telescopic section.

13. The telescopic boom with an assembly head in accordance with claim 1, wherein the telescopic tube section contacts a support point of the inner telescopic section on which an outer telescopic section of an inner boom set is supported in an assembled state.

* * * * *